United States Patent [19]

Morita

[11] Patent Number: 4,717,534

[45] Date of Patent: Jan. 5, 1988

[54] NUCLEAR FUEL CLADDING CONTAINING A BURNABLE ABSORBER

[75] Inventor: Toshio Morita, Wilkinsburg, Pa.

[73] Assignee: Westinghouse Electric Corp., Pittsburgh, Pa.

[21] Appl. No.: 702,972

[22] Filed: Feb. 19, 1985

[51] Int. Cl.⁴ .............................................. G21C 3/06
[52] U.S. Cl. .................................. 376/419; 376/414; 376/416; 376/417
[58] Field of Search ................. 376/414, 416, 417, 419

[56] References Cited

U.S. PATENT DOCUMENTS

| | | |
|---|---|---|
| 3,019,176 | 1/1962 | McReynolds et al. |
| 3,103,476 | 9/1963 | Mumm |
| 3,334,019 | 8/1967 | Bogaardt et al. |
| 3,356,618 | 12/1967 | Rich et al. |
| 3,427,222 | 2/1969 | Biancheria et al. |
| 3,442,761 | 5/1969 | Feraday |
| 3,620,691 | 11/1971 | Rubel ................... 376/417 |
| 3,625,821 | 12/1971 | Ricks |
| 3,928,130 | 12/1975 | Pawliw |
| 4,022,662 | 5/1977 | Gordon et al. |
| 4,029,545 | 6/1977 | Gordon et al. ........... 376/417 |
| 4,045,288 | 8/1977 | Armijo |
| 4,613,479 | 9/1986 | Foster ................... 376/414 |

FOREIGN PATENT DOCUMENTS 682057 3/1964 Canada.
914163 12/1962 United Kingdom ............... 376/416

OTHER PUBLICATIONS

Volkov et al., "Use of Burnable Poisons in Nuclear Reactors", Atomnaya Epereiya, vol. II, No. 2, pp. 109-125, Aug. 1961.
Howe et al., editors, "Reactor Control Materials", Metallurgy and Fuels, Progress in Nuclear Energy, Series V, vol. 2, Pergamon Press, 1959, Chapter 7-1, pp. 193-205.

Primary Examiner—Deborah L. Kyle
Assistant Examiner—Richard W. Wendtland
Attorney, Agent, or Firm—D. M. Satina

[57] ABSTRACT

A nuclear fuel rod cladding having a burnable absorber integrally incorporated therein has an outer tubular layer of a zirconium alloy; an intermediate layer, of a thickness less than the outer tubular layer, of a zirconium alloy containing a boron-containing burnable absorber; and an inner layer, of a thickness less than the intermediate layer, of zirconium metal. The layers are bonded together to form a cladding for the containment of nuclear fuel.

15 Claims, 3 Drawing Figures

NUCLEAR FUEL CLADDING CONTAINING A BURNABLE ABSORBER

FIELD OF THE INVENTION

The present invention relates to an improved nuclear fuel cladding and fuel element formed with such a cladding wherein the cladding contains a boron-containing burnable absorber integral therewith.

BACKGROUND OF THE INVENTION

It is well-known that the incorporation, in various manners, of a burnable absorber with nuclear fuel rods, which enables the use of excessive amounts of fuel in a reactor during the initial life of the fuel, can extend the life of the fuel rods. In some instances, the burnable absorber is mixed directly with the fuel and integrated therewith, while in other instances, a burnable absorber coating may be applied to the surface of fuel pellets, or discrete forms of a burnable absorber may be interspersed between conventional fuel pellets, or otherwise located within the cladding for the nuclear fuel. In U.S. Pat. No. 3,427,222, for example, a fuel rod is comprised of a tubular cladding that contains fuel pellets which have a fusion-bonded coating on the surface of each pellet, the coating comprised of a boron-containing material that functions as a burnable absorber.

It has also been proposed to provide cladding materials such as zirconium-based alloys that have various coatings or barrier means on the inside wall of the tubular cladding to protect the cladding from attack by constituents released from the nuclear fuel during operation of a reactor containing the fuel rod. As examples of such coatings or barrier means which cover the full surface of the cladding, U.S. Pat. No. 4,022,662 describes a cladding in connection with a separate unattached metal liner comprised of stainless steel, copper, copper alloys, nickel or nickel alloys, the liner disposed between the cladding and the fuel material. A diffusion barrier of chromium or chromium alloy is also disposed between the cladding and the metal liner. In U.S. Pat. No. 4,045,288, a composite fuel element cladding is described which comprises a zirconium or zirconium alloy substrate having a metal barrier of 1-4 percent of the wall thickness formed from niobium, aluminum, copper, nickel, stainless steel and iron, and an inner layer of stainless steel, zirconium, or a zirconium alloy metallurgically bonded on the inner surface of the metal barrier.

Also, it has been proposed to provide a burnable absorber, such as a boron-containing compound, directly in connection with the cladding material. U.S. Pat. No. 3,019,176, for example, discloses a fuel element that has a mixture of particulate fissionable material and a metal hydride moderator disposed in a matrix of a radiation resistant metal which is encased in a container. The matrix is bonded to the metal hydride and to the container to form an integral fuel element. U.S. Pat. No. 3,103,476 discloses the incorporation of a burnable absorber, such as boron, into the cladding of a nuclear fuel element. The boron is added to the cladding, which is preferably stainless steel, but may be zirconium or other material, in an amount of 200-1000 parts of natural boron per million parts of cladding material and homogeneously dispersed throughout the cladding. U.S. Pat. No. 3,625,821 describes a nuclear fuel element that has a zirconium or zircaloy cladding tube, with the inner surface of the tube coated with boron which is a burnable absorber. The boron is dispersed, as finely dispersed particles, in a matrix of nickel or other retaining metal. In Canadian Pat. No. 682,057, there is also described a fuel element where a cladding contains a burnable absorber. An outer layer of the tube may be of a corrosion resistant metal or alloy, and an inner layer is preferably comprised of the same material but contains, in addition, boron that may be a mixture or dispersed in the metal. The stated advantage over cladding containing dispersed boron is that boron, as part of the inner layer, is not contacted by coolant.

It is an object of the present invention to provide a composite nuclear fuel cladding that has a burnable absorber integrally incorporated therein.

SUMMARY OF THE INVENTION

A nuclear fuel cladding having a burnable absorber integrally incorporated therein is formed as a hollow composite tube which has an outer tubular layer of a zirconium alloy, an intermediate layer, of a thickness less than the outer layer, of a zirconium alloy having admixed therewith a boron-containing burnable absorber, and an inner layer, of a thickness less than the intermediate layer, of zirconium metal. The layers of the composite are bonded together as an integral unit and is used in nuclear fuel rods.

The zirconium alloys are preferably Zircaloys, while the preferred boron-containing burnable absorber is zirconium boride. Also, in the preferred embodiment, the outer tubular layer has a thickness of about 15 mils, the intermediate layer a thickness of about 3-5 mils, and the inner layer a thickness of about 1-2 mils.

DETAILED DESCRIPTION

The present invention provides a nuclear fuel cladding and a fuel rod containing the same, where the cladding is a composite material having a boron-containing burnable absorber integrally incorporated therein.

Figure 1:
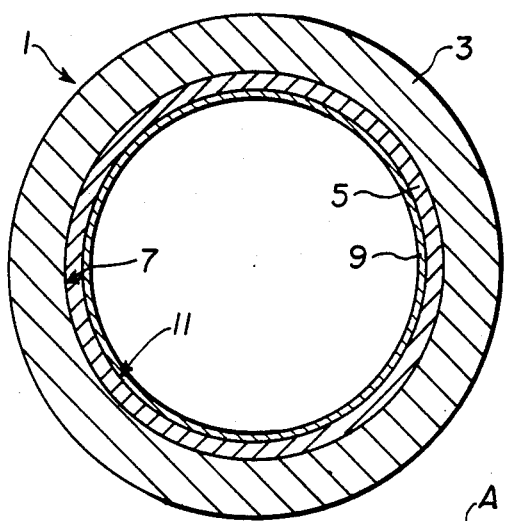
FIG. 1 shows a transverse cross-section through a composite tubular cladding of the present invention.

Referring now to FIG. 1, there is illustrated a transverse cross-section of the composite cladding 1. The composite cladding 1 is composed of an outer tubular layer 3 of zirconium alloy having a first thickness, and an intermediate layer 5 having a thickness less than the thickness of tubular layer 3, formed from a mixture of a boron-containing material, such as zirconium boride, and a zirconium alloy, bonded to the inner wall 7 of the outer tubular layer 3. An inner layer 9 of zirconium metal, which has a thickness less than the thickness of the intermediate layer 5 is bonded to the inner surface 11 of the intermediate layer 5.

The outer tubular layer 3 is formed from a zirconium alloy which contains less than about 5 percent by weight of alloying elements, usable in nuclear reactors. Such zirconium alloys contain elements which increase the mechanical properties of zirconium metal and/or the corrosion resistance of zirconium metal. The elements that are used in the formation of such alloys include niobium, oxygen, tin, iron, chromium, nickel, molybdenum, copper, vanadium and the like. Especially useful alloys are a zirconium alloy containing about 2.5 percent niobium and the zirconium alloys known as Zircaloy-2 and Zircaloy-4. Zircaloy-2 contains, by weight, about 1.2–1.7 percent tin; 0.07–0.20 percent iron; 0.05–0.15 percent chromium; and about 0.03–0.08 percent nickel; the balance being zirconium. Zircaloy-4 contains, by weight, about 1.2–1.7 percent tin; 0.12–0.18 percent iron, and 0.05–0.15 percent chromium, the balance being zirconium. The intermediate layer 5 is also formed from a zirconium alloy, of the alloys defined relative to the outer tubular layer 3, and preferably of the same alloy as that of the outer tubular layer, and has admixed therewith a boron-containing burnable absorber. The boron-containing burnable absorber is selected from boron compounds such as natural boron, enriched boron (boron having a higher percentage by weight of the isotope $B^{10}$ than natural boron) zirconium boride ($ZrB_2$), boron carbide ($B_4C$), boron nitride ($BN$), and the like. The boron-containing burnable absorber is dispersed throughout the zirconium alloy, in an amount of less than 3 percent by weight of the alloy, and the mixture formed into an intermediate layer that is bonded to the inner surface of the outer zirconium alloy tubular layer.

The inner layer 9 is a layer of zirconium metal and has a thickness less than the thickness of the intermediate layer 5, and is bonded to the inner surface of the intermediate layer such that a composite tubular cladding is produced that has a boron-containing burnable absorber integrally incorporated therein. The inner zirconium layer prevents a problem of stress corrosion and possible failure of the tubular cladding by "pellet-clad interaction". This term is used to describe the attack on the cladding by volatile fissile materials such as iodine, cadmium, or other volatile elements released by the fuel during operation of the reactor. Such attack, coupled with cladding operating stresses, can produce stress crack corrosion of the metallic cladding and eventual penetration of the wall of the tubular cladding. Also, during irradiation, the boron-containing burnable absorber results in helium gas being produced in the intermediate layer, and the inner layer of zirconium metal prevents the penetration of such helium gas into the interior space of the tubular cladding.

Since the intermediate layer has a thicker zirconium alloy tubular layer 3 on its outer surface, and a thinner zirconium layer 9 on its inner surface, this intermediate layer 5 is subject to neither the coolant for the reactor which contacts the outer tubular layer 3, nor the fuel pellets and emission products thereof which contact the inner layer 9.

Figure 3:
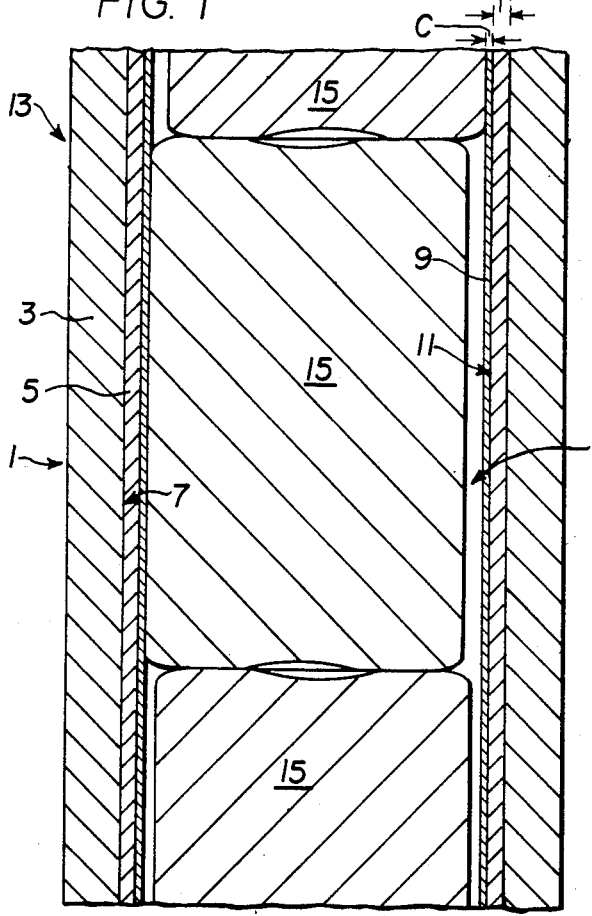
FIG. 3 shows an enlarged cross-sectional view of the fuel element illustrated in FIG. 2 exposing a diametrical, longitudinal plane of the composite tubular cladding.

The outer tubular layer 3 has the largest cross-sectional area and, as such, serves the normal function of a cladding, the mechanical integrity and strength to contain the fuel pellets and resist corrosion from the fuel, emission products, and the coolant in which the fuel elements are positioned. As illustrated in FIG. 3, the outer zirconium alloy tubular layer 3 has a thickness A of at least about 15 mils. The intermediate layer 5, the zirconium alloy containing the boron-containing burnable absorber has a thickness B, less than the thickness A, and is preferably a thickness of about 3–5 mils. The thickness will vary dependent upon the type of boron-containing burnable absorber used and the amount of burnable absorber desired. The inner zirconium metal layer 9 has a thickness C, less than the thickness B, and is preferably a thickness of about 1–2 mils. This layer is the thinnest layer, and is used to isolate the intermediate layer from the fuel pellets. The overall thickness of the component cladding, $A+B+C$, is preferably between 18–22 mils, with $A>B>C$. In most instances, due to the large thickness of the outer tubular layer A, the thickness of the outer tubular layer A will be at least twice the thickness of the sum of the thicknesses of the intermediate layer and the inner layer, i.e. $A>2(B+C)$.

The intermediate layer, which contains the boron-containing burnable absorber can be fabricated to provide specific desired burnable absorber contents. The concentration of the burnable absorber in a specific application will depend on the requirements of the nuclear system, manufacturability, and the irradiation behavior during operation of the reactor in which the fuel element is used. For the same nuclear system requirements, the concentration of the burnable absorber can be adjusted by either altering the thickness of the intermediate layer or the $B^{10}$ enrichment of the boron-containing burnable absorber.

As an example of how the amount of boron-containing absorber can be determined, using a 5 mil thick intermediate layer of zirconium boride (ZrB) in a Zircaloy-4 alloy, the following describes the key parameters. The symbols and their typical values are as follows:

| Symbol | Unit | Description | (Typical) Value |
|---|---|---|---|
| D | in | Clad OD | 0.374 |
| $\tau$ | mil | Thickness of Zr—$ZrB_2$ layer | 5 |
| B | mg/cm | B-10 concentration per unit length | 0.6 |
| E | | B-10 enrichment | 0.19 (Nat) 1.0 (Enriched B) |
| $\rho 1$ | gr/cc | $ZrB_2$ density | 6.09 |
| $\rho 2$ | gr/cc | Zircaloy-4 density | 6.55 |
| $F_B$ | | Fraction of Boron in $ZrB_2$ | 0.1917 |
| C | w/o | w/o of $ZrB_2$ in Zircaloy-4 | <3 |
| V | v/o | v/o of $ZrB_2$ in Zircaloy-4 | <3 |

C and V are related as $$C = \frac{V1}{V\rho_1 + (1-V)\rho_2} = \frac{6.09 \, V}{6.55 - 0.46 \, V}$$

$$V = \frac{6.55 \, C}{6.09 + 0.46 \, C}$$

The B-10 content per unit length is obtained by $$B = \pi D\tau \times (2.54)^2 \times V \times \rho_1 \times E/100$$

$$VE = \frac{B \times 100}{\pi D\tau (2.54)^2 \rho_1 F_B} = 2.26B$$

$$V = \frac{1.356}{E} \, (v/o \text{ of } ZrB_2)$$

For typical light water reactors, $ZrB_2$ concentration in the mixture layer can be easily in manufacturability range by adjusting the layer thickness and boron-10 enrichment.

The composite tubular cladding may be formed by various processes. For example, an intermediate layer can be formed by powder metallurgy techniques in a thicker construction than that desired in the final tube and inserted in an outer tubular member also of a thicker construction than that desired in the final product and the two structures subjected to cold working to reduce the same, such as pilgering, to give the desired diameter and thickness, and bonding, of these two layers and then the zirconium inner layer coated on the inner surface of the intermediate layer, and bonded thereto, to form the desired component tubular cladding.

Figure 2:
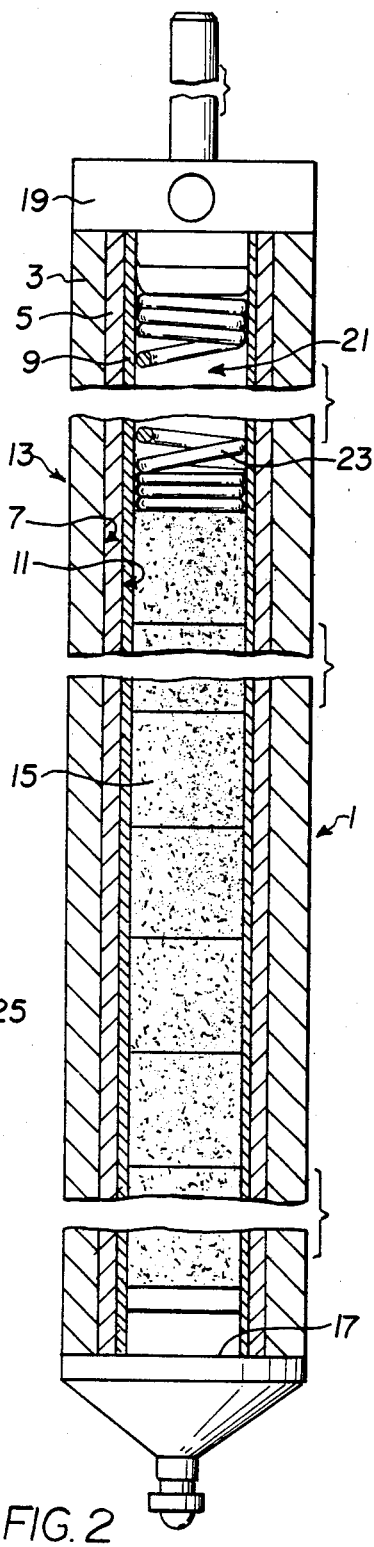
FIG. 2 shows a schematic representation of a partial cross-section through a nuclear reactor fuel element of the present invention.

As illustrated in FIGS. 2 and 3, a nuclear fuel element 13 using the cladding 1 of the present invention is used to hermetically seal fuel pellets 15. The fuel pellets 15, as is conventional, are preferably sintered pellets of enriched uranium dioxide, or mixed uranium-plutonium dioxide. The pellets are retained within the cladding 1 by a bottom Zircaloy end plug 17 which has previously been welded to the composite tubular cladding, and a welded Zircaloy top end cap 19. A void space or plenum 21 is provided between the top pellet and the Zircaloy top end cap 19 and a biasing means, such as spring 23 restrains the pellets 15 within the cladding 1, with clearance spaces 25 (FIG. 3) left between the pellets and the inner layer 9 of the composite cladding 1. The clearance space and plenum are filled with a high purity, inert atmosphere having high thermal conductivity, such as high purity helium pressurized to about 2 to 5 atmosphere (STP).

The present composite cladding provides the benefits associated with use of a boron-containing burnable absorber in a fuel rod while separating the burnable absorber handling from the fuel pellet manufacturing line. Also, helium gas resulting from irradiation of the burnable absorber is prevented from entering the interior space of the tube and improved properties are provided to prevent pellet clad interaction. In addition, the present invention provides more flexibility as the amount of burnable absorber usable and the pattern of such absorber in the fuel rod later in the manufacturing stage of the fuel rod.

What is claimed is:

1. A nuclear fuel cladding having a predetermined concentration of burnable absorber integrally incorporated therein, for use in containing a nuclear fuel in a reactor, the cladding formed as a hollow composite tube comprising:
    an outer tubular layer, having a first thickness of at least 15 mils, consisting essentially of a first zirconium alloy;
    an intermediate layer bonded to the inner wall of said outer tubular layer, having a second thickness less than said first thickness, consisting essentially of a mixture of a boron-containing material having a predetermined enrichment of boron and a second zirconium alloy, said second thickness being defined by said predetermined enrichment of boron in said boron-containing material and by the predetermined concentration of burnable absorber incorporated into said fuel cladding; and
    an inner layer of zirconium metal, having a third thickness less than said second thickness, bonded to said intermediate layer, said third thickness being sufficient to isolate said intermediate layer from said nuclear fuel.

2. A nuclear fuel cladding as defined in claim 1 wherein said first and said second zirconium alloys are selected from the group consisting of Zircaloy-2, Zircaloy-4 and a zirconium alloy containing about 2.5 percent by weight niobium.

3. A nuclear fuel cladding as defined in claim 1 wherein said boron-containing material is selected from the group consisting of natural boron, enriched boron, zirconium boride, boron nitride, boron carbide, or mixtures thereof.

4. A nuclear fuel cladding as defined in claim 1 wherein said outer tubular layer is at least twice the thickness of the sum of the thicknesses of the intermediate layer and the inner layer.

5. A nuclear fuel cladding as defined in claim 1 wherein said composite cladding has a wall thickness of between 18–22 mils.

6. A nuclear fuel cladding as defined in claim 1 wherein said intermediate layer has a thickness of between 3–5 mils.

7. A nuclear fuel cladding as defined in claim 6 wherein said inner layer has a thickness of between 1–2 mils.

8. A nuclear fuel cladding having a burnable absorber integrally incorporated therein, for use in containing a nuclear fuel in a reactor, the cladding formed as a hollow composite tube comprising:
    an outer tubular layer, having a first thickness of at least 15 mils, consisting essentially of a zirconium alloy;
    an intermediate layer bonded to the inner wall of said outer tubular layer, having a second thickness less than said first thickness, of about 3–5 mils, consisting essentially of a mixture of a zirconium boride and a zirconium alloy; and
    an inner layer of zirconium metal, having a thickness less than said second thickness, of about 1–2 mils, bonded to said intermediate layer.

9. In a nuclear fuel rod comprising a metallic tubular cladding formed from a metal selected from zirconium and a zirconium alloy, containing a nuclear fuel, and having end sealing means thereon to hermetically seal said nuclear fuel within said metallic tubular cladding, the improvement wherein said metallic tubular cladding is a composite, said cladding having integrally incorporated a predetermined concentration of burnable absorber material, said cladding comprising an outer tubular layer having a first thickness, sufficient to provide the mechanical integrity and strength to contain the nuclear fuel, said first thickness being at least about 15 mils, said outer tubular layer consisting essentially of a first zirconium alloy; an intermediate layer bonded to the inner wall of said outer tubular layer, having a second thickness less than said first thickness, consisting essentially of a mixture of a boron-containing material having a predetermined enrichment of boron and a second zirconium alloy, said second thickness being determined by the predetermined concentration of burnable absorber incorporated into said cladding and the predetermined enrichment of boron in said boron-containing material; and an inner layer of zirconium metal, having a third thickness less than said second thickness, said third thickness being between about 1–2 mils, bonded to said intermediate layer.

10. A nuclear fuel rod as defined in claim 9 wherein said first and said second zirconium alloys are selected from the group consisting of Zircaloy-2, Zircaloy-4 and a zirconium alloy containing about 2.5 percent by weight niobium.

11. A nuclear fuel rod as defined in claim 9 wherein said boron-containing material is selected from the group consisting of natural boron, enriched boron, zirconium boride, boron nitride, boron carbide, or mixtures thereof.

12. A nuclear fuel rod as defined in claim 9 wherein said outer tubular layer is at least twice the thickness of the sum of the thicknesses of the intermediate layer and the inner layer.

13. A nuclear fuel rod as defined in claim 9 wherein said composite cladding has a wall thickness of between 18–22 mils.

14. A nuclear fuel rod as defined in claim 9 wherein said intermediate layer has a thickness of between 3–5 mils.

15. In a nuclear fuel rod comprising a metallic tubular cladding formed from a metal selected from zirconium and a zirconium alloy, containing a nuclear fuel, and having end sealing means thereon to hermetically seal said nuclear fuel within said metallic tubular cladding; the improvement wherein said metallic tubular cladding is a composite of an outer tubular layer having a first thickness of at least 15 mils consisting essentially of a zirconium alloy; an intermediate layer bonded to the inner wall of said outer tubular layer having a second thickness less than said first thickness, of about 3–5 mils, consisting essentially of a mixture of zirconium boride and a zirconium alloy; and an inner layer of zirconium metal, having a thickness less than said second thickness, of about 1–2 mils, bonded to said intermediate layer.

* * * * *